_(12)_ United States Patent
Cui et al.

(10) Patent No.: US 8,737,401 B2
(45) Date of Patent: May 27, 2014

(54) COMMUNICATION USING MPLS-ARP MESSAGING

(75) Inventors: Zhenlong Cui, Tokyo (JP); Kazuo Takagi, Tokyo (JP); Akira Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 116 days.

(21) Appl. No.: 13/351,417

(22) Filed: Jan. 17, 2012

(65) Prior Publication Data

US 2012/0189011 A1    Jul. 26, 2012

(30) Foreign Application Priority Data

Jan. 24, 2011   (JP) .................................. 2011-12059

(51) Int. Cl.
*H04L 12/28* (2006.01)
(52) U.S. Cl.
USPC ............ 370/392; 370/412; 370/419; 370/912
(58) Field of Classification Search
USPC .......... 370/351, 389, 392, 412, 901, 902, 912
See application file for complete search history.

(56) References Cited

U.S. PATENT DOCUMENTS

| 7,039,687 | B1 * | 5/2006 | Jamieson et al. | 709/220 |
| 7,848,333 | B2 * | 12/2010 | Zhu et al. | 370/397 |
| 2003/0161304 | A1 * | 8/2003 | deBoer et al. | 370/386 |
| 2005/0053079 | A1 * | 3/2005 | Havala | 370/400 |
| 2005/0147111 | A1 * | 7/2005 | Moleyar et al. | 370/412 |

FOREIGN PATENT DOCUMENTS

| JP | 2001053752 A | 2/2001 |
| JP | 2009182451 A | 8/2009 |
| WO | 2004084506 A | 9/2004 |

* cited by examiner

*Primary Examiner* — Omar Ghowrwal
(74) *Attorney, Agent, or Firm* — Sughrue Mion, PLLC

(57) ABSTRACT

A communication apparatus comprises: a memory unit which correlates a label assigned to a packet and an address of a source of the packet, and memorizes them as an entry; a receiving unit which receives a packet from a network; a learning unit which judges whether or not there exists an entry corresponding to the received packet in the memory unit, and in case there exists no entry corresponding to the received packet in the memory unit, stores a label assigned to the received packet and an address of a source of the received packet in the memory unit; and a processing unit which, in case there exists an entry corresponding to the received packet in the memory unit, assigns an address corresponding to the received packet to the received packet.

6 Claims, 14 Drawing Sheets

Fig.3

| MPLS LABEL | PORT NUMBER | MAC ADDRESS |
|---|---|---|
| X1 | 0 | B |
| Y1 | 1 | C |

MPLS-MAC TABLE 104

Fig.4

FIB 106

| MPLS LABEL | RECEIVING PORT | MPLS LABEL | TRANSMITTING PORT |
|---|---|---|---|
| X2 | 2 | X1 | 0 |
| Y2 | 3 | Y1 | 1 |

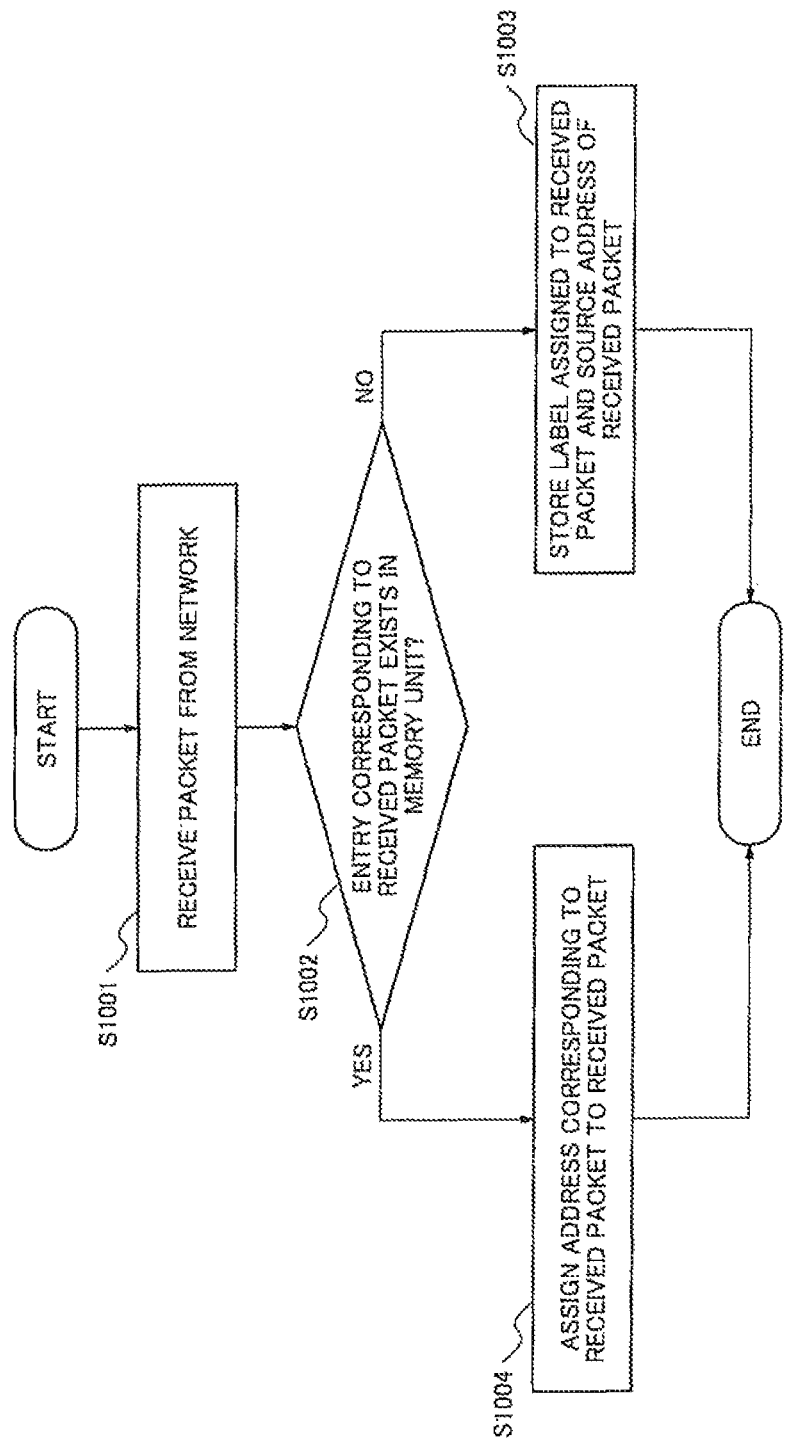

COMMUNICATION USING MPLS-ARP MESSAGING

This application is based upon and claims the benefit of priority from Japanese Patent Application No. 2011-012059, filed on Jan. 24, 2011, the disclosure of which is incorporated herein in its entirety by reference.

TECHNICAL FIELD

The present invention relates to a communication apparatus, a communication system and a communication method.

BACKGROUND ART

In recent years, as a packet transport technology, an MPLS-TP (Multi Protocol Label Switching-Transport Profile) technology is attracting attention. MPLS-TP is considered as a subset of MPLS (Multi Protocol Label Switching-Transport Profile). MPLS-TP has strengthened ability for operation and maintenance and reliability compared with MPLS.

In particular, concerning strengthening of reliability, an MPLS transport network (infrastructure which supports various communication services such as the internet and a leased line) which does not depend on IP (Internet Protocol) is being built. Also, in MPLS-TP, control plain (C-Plane) and data plain (D-Plane) are made independent, and even if failures occur in C-Plane, user traffic will not be influenced and highly reliable services are realized.

Technologies in relation to a MAC (Media Access Control) search system of an MPLS-TP apparatus are described, for example, in Patent documents 1-3.

Inventions described in Patent documents 1 and 2 learn combination of a MAC address and a receiving port and specify an output port.

Invention described in Patent document 3 is, in order to learn a MAC address corresponding to a destination IP address, one which is realized by using an ARP (Address Resolution Protocol) packet for solving it

PRECEDING TECHNICAL LITERATURE

Patent Document

[Patent document 1] International Publication WO2004/084506
[Patent document 2] Publication of Japanese Patent Laid-open Application No. 2009-182451
[Patent document 3] Publication of Japanese Patent Laid-open Application No. 2001-053752

SUMMARY

An exemplary object of the invention is, when an MPLS-TP apparatus transmits an MPLS-TP packet via a predetermined network, to provide a MAC search system and a MAC search method of the MPLS-TP apparatus which does not depend on an IP layer and which solves a destination MAC address that should be assigned to the packet.

A communication apparatus according to an exemplary aspect of the invention includes:
a memory unit which correlates a label assigned to a packet and an address of a source of the packet, and memorizes them as an entry;
a receiving unit which receives a packet from a network;
a learning unit which judges whether or not there exists an entry corresponding to the received packet in the memory unit, and in case there exists no entry corresponding to the received packet in the memory unit, stores a label assigned to the received packet and an address of a source of the received packet in the memory unit; and
a processing unit which, in case there exists an entry corresponding to the received packet in the memory unit, assigns an address corresponding to the received packet to the received packet.

A communication system according to an exemplary aspect of the invention includes a plurality of communication apparatuses connected each other, wherein at least one among the plurality of communication apparatuses comprises:
a memory unit which correlates a label assigned to a packet and an address of a source of the packet, and memorizes them as an entry;
a receiving unit which receives a packet from a network;
a learning unit which judges whether or not there exists an entry corresponding to the received packet in the memory unit, and in case there exists no entry corresponding to the received packet in the memory unit, stores a label assigned to the received packet and an address of a source of the received packet in the memory unit; and
a processing unit which, in case there exists an entry corresponding to the received packet in the memory unit, assigns an address corresponding to the received packet to the received packet.

A communication method according to an exemplary aspect of the invention includes:
receiving a packet from a network;
judging whether or not there exists an entry corresponding to the received packet in a memory unit which correlates a label assigned to a packet and an address of a source of the packet, and memorizes them as an entry;
in case there exists no entry corresponding to the received packet in the memory unit, storing a label assigned to the received packet and an address of a source of the received packet in the memory unit; and
in case there exists an entry corresponding to the received packet in the memory unit, assigning an address corresponding to the received packet to the received packet.

BRIEF DESCRIPTION OF THE DRAWINGS

Exemplary features and advantages of the present invention will become apparent from the following detailed description when taken with the accompanying drawings in which:

FIG. 3 is an example of a table which stores corresponding relationship between a combination of an MPLS label and a port, and a MAC address;

FIG. 4 is an example of a table which stores corresponding relationship between a label of a received MPLS-TP packet and a receiving port, and a label and a transmitting port of a next hop;

FIG. 14 is a flow chart showing operation of the embodiment 3 according to the present invention.

EXEMPLARY EMBODIMENT

<Features of the Invention>

The present invention is characterized by, in an MPLS-TP apparatus which does not include an IP layer and in case lower layer is an Ethernet (hereinafter, registered trademark), avoiding cost increase and erroneous setting by manual setting by enabling it to assign an appropriate destination MAC address automatically to an MPLS label.

<The Embodiment 1>

[Structure]

Figure 1:
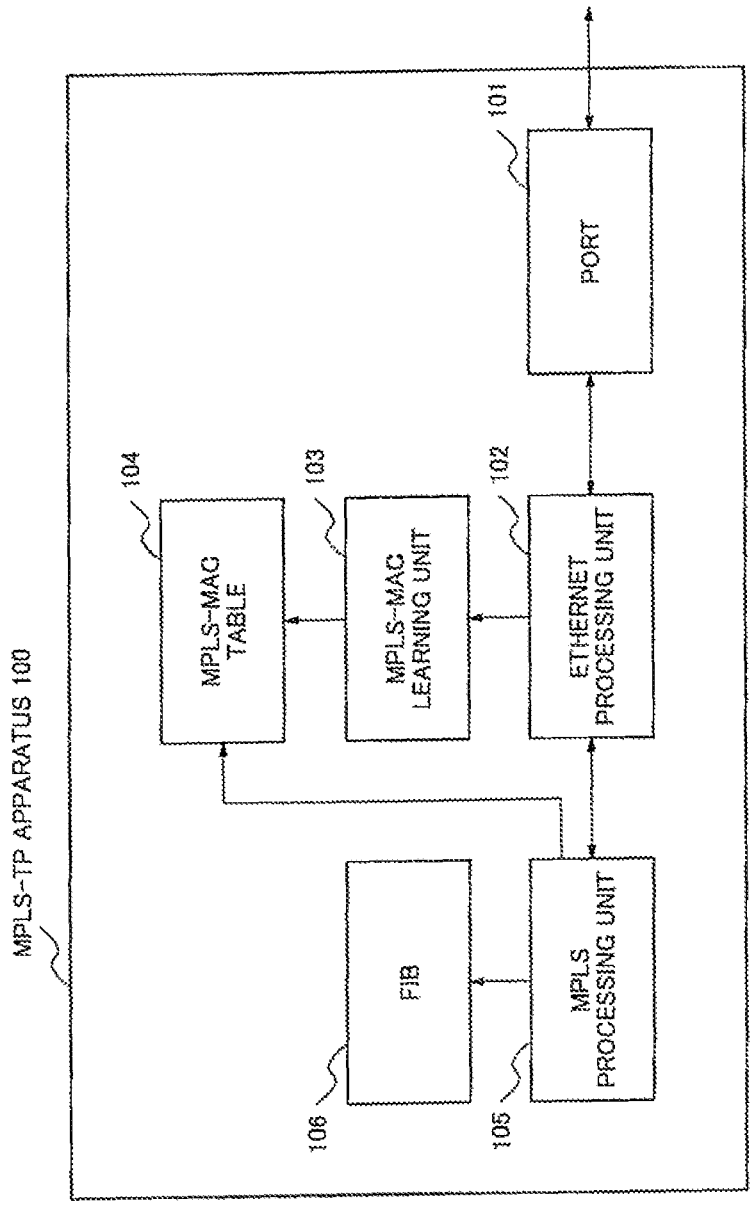
FIG. 1 is an explanatory drawing showing an example of an exemplary configuration of an MPLS-TP apparatus according to the present invention.

FIG. 1 is a figure showing an example of an exemplary configuration of an MPLS-TP apparatus according to the present invention.

According to FIG. 1, an MPLS-TP apparatus 100 according to the embodiment 1 includes a port 101, an Ethernet processing unit 102, an MPLS-MAC learning unit 103, an MPLS-MAC table 104, an MPLS processing unit 105 and an FIB (Forwarding Information Base) 106.

The port 101 transmits an MPLS-TP packet received from outside to the Ethernet processing unit 102 or transmits an MPLS-TP packet received from the Ethernet processing unit 102 to outside.

Figure 2:
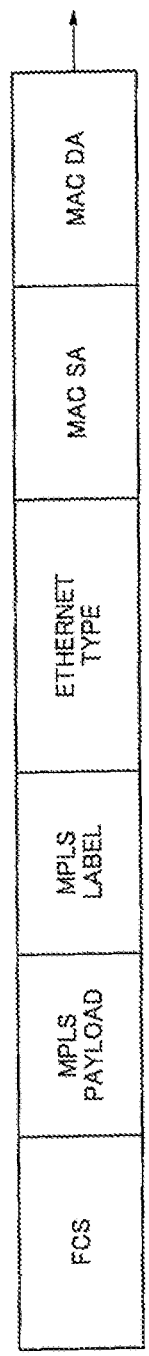
FIG. 2 is an example of a block diagram of an MPLS-TP packet.

In case an MPLS-TP packet shown in FIG. 2 is received from the port 101, the Ethernet processing unit 102 judges whether or not Ethernet Type is a value which indicates an MPLS packet (0x8847, for example). In case the Ethernet Type is a value which indicates an MPLS packet, after notifying the MPLS-MAC learning 103 and performing MAC learning, the Ethernet processing unit 102 transfers it to the MPLS-TP processing unit 105.

FIG. 2 is a figure which indicates an example of a structure of an MPLS-TP packet.

As shown in FIG. 2, the MPLS-TP packet includes FCS (Frame Check Sequence), MPLS Payload, MPLS Label, Ethernet Type, MAC SA (Source MAC address) and MAC DA (Destination MAC address).

When the MPLS-MAC learning unit 103 receives notification from the Ethernet processing unit 102, it searches the MPLS-MAC table 105 based on an MPLS label of a received packet and receiving port information. As a result of the search, in case a corresponding entry is not registered, the MPLS-MAC learning unit 103 adds an entry to the MPLS-MAC table 105 and registers a source address of the received packet in MAC SA.

On the contrary, in case a corresponding entry is already registered, a source address is overwritten in the entry.

The MPLS-MAC table 104 is a table, as shown in FIG. 3, which stores corresponding relationship between a combination of an MPLS label and a port, and a MAC address.

The MPLS-TP processing unit 105 searches the FIB 106 and acquires an MPLS-TP label and a transmitting port of a next hop based on a label of an MPLS-TP packet and a receiving port received from the Ethernet processing unit 102.

After that, the MPLS-TP processing unit 105 searches the MPLS-MAC table 104 based on the MPLS-TP label and the transmitting port of the next hop.

When a search result for the MPLS-MAC table 104 indicates that a corresponding entry is registered, the MPLS-TP processing unit 105 assigns the search result as a destination address of the MPLS-TP packet and transmits it to the Ethernet processing unit 102. Also, in case a corresponding label is not registered in the MPLS-MAC table 104, the MPLS-TP processing unit 105 assigns a broadcast address to a destination address of the MPLS-TP packet and transmits it. The MPLS-TP processing unit 105 may assign a multicast address instead of the broadcast address.

The FIB 106 is a transfer table of an MPLS-TP packet and is a table, as shown in FIG. 4, which stores corresponding relationship between a label of a received MPLS-TP packet and a receiving port, and a label and a transmitting port of a next hop.

[Description of Operation of the Embodiment 1]

Figure 5:
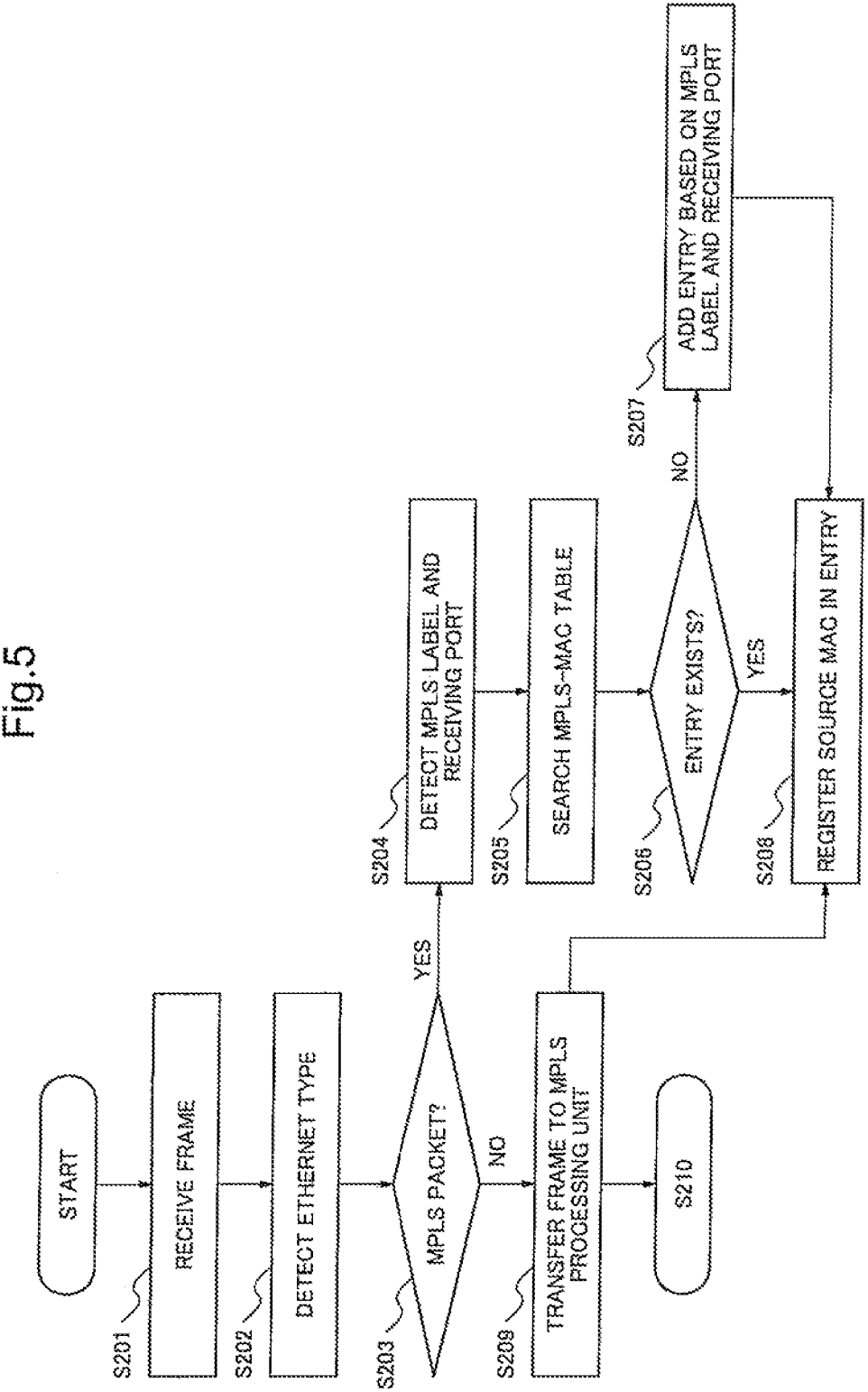
FIG. 5 is a part of a flow chart illustrating operation of the embodiment 1 according to the present invention.
Figure 6:
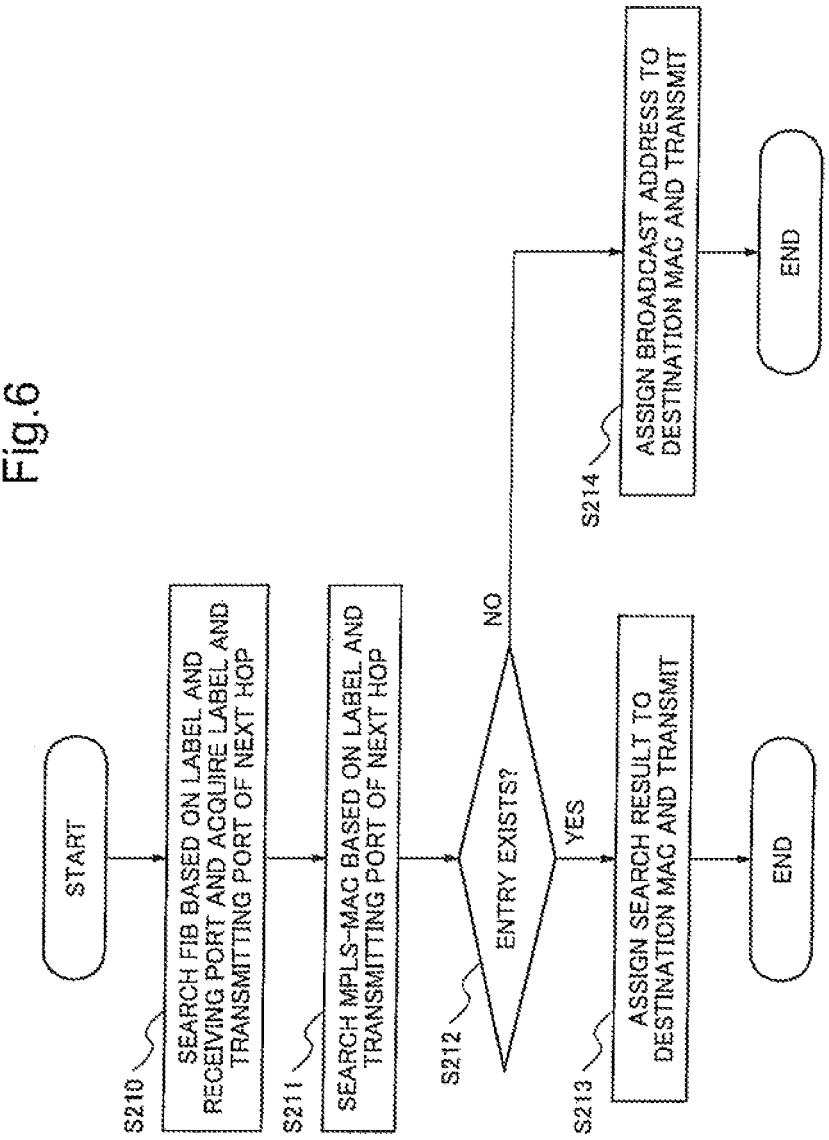
FIG. 6 is the rest of the flow chart illustrating operation of the embodiment 1 according to the present invention.

In the following, operation of the embodiment 1 according to the present invention will be described using a flow chart shown in FIG. 5 and FIG. 6.

First, referring to the flow chart of FIG. 5, operation will be described in detail since the MPLS-TP apparatus 100 receives an MPLS-TP packet from outside until it transmits the MPLS-TP packet to the MPLS-TP processing unit 102.

The MPLS-TP apparatus 100 receives an MPLS-TP packet from outside (Receive frame: S201). Next, the Ethernet processing unit 102 detects Ethernet Type as a type of a network standard (S202).

When the Ethernet Type of the received packet is a value which indicates an MPLS packet (S203), the Ethernet processing unit 102 detects an MPLS label and a receiving port (S204).

After that, the MPLS-MAC learning unit 103 searches the MPLS-MAC table 104 making the MPLS label and the receiving port as a search key (S205).

When a search result for the MPLS-MAC table 104 indicates that there exists no corresponding entry (S206/no), the MPLS-MAC learning unit 103 adds an entry corresponding to the search key to the MPLS-MAC table 104 (S207). Next, after registering a source MAC address of the MPLS-TP packet in the entry of the MPLS-MAC table 104 corresponding to the search key, the MPLS-MAC learning unit 103 transfers the MPLS-TP packet to the MPLS processing unit 105 (S208-S209).

On the contrary, when there exists a corresponding entry in the MPLS-MAC table 104 (S206/Yes), after overwriting and registering a source MAC address of the MPLS-TP packet in the entry corresponding to the search key, the MPLS-MAC learning unit 103 transfers the MPLS-TP packet to the MPLS processing unit 105 (S208-S209).

Next, referring to the flow chart of FIG. 6, operation will be described in detail until packet transfer processing is performed and transmission to outside is performed in the MPLS-TP processing unit 105.

The MPLS-TP processing unit 105 searches the FIB 106 and acquires an MPLS-TP label and a transmitting port of a next hop based on a label of the MPLS-TP packet and a receiving port received from the Ethernet processing unit 102 (S210).

After that, the MPLS-TP processing unit 105 searches the MPLS-MAC table 104 based on the MPLS-TP label and the transmitting port of the next hop (S211). When a search result for the MPLS-MAC table 104 indicates that a corresponding entry is registered (S212), the MPLS-TP processing unit 105 assigns the search result as a destination address of the MPLS-TP packet and transmits it to the Ethernet processing unit 102 (S213).

Also, in case a corresponding label is not registered in the MPLS-MAC table 104 (S212), the MPLS-TP processing unit 105 assigns a broadcast address to a destination address of the MPLS-TP packet and transmits it (S214). The MPLS-TP processing unit 105 may assign a multicast address instead of the broadcast address.

[Advantageous Effect]

The embodiment 1 of the present invention has an effect indicated below.

According to the embodiment 1, in an MPLS-TP apparatus which does not include an IP layer and in case lower layer is an Ethernet, by making it possible to assign an appropriate destination MAC address to an MPLS label, cost increase and erroneous setting by manual setting can be avoided.

[The Embodiment 2]

[Structure]

Next, the embodiment 2 according to the present invention will be described in detail with reference to drawings.

Figure 7:
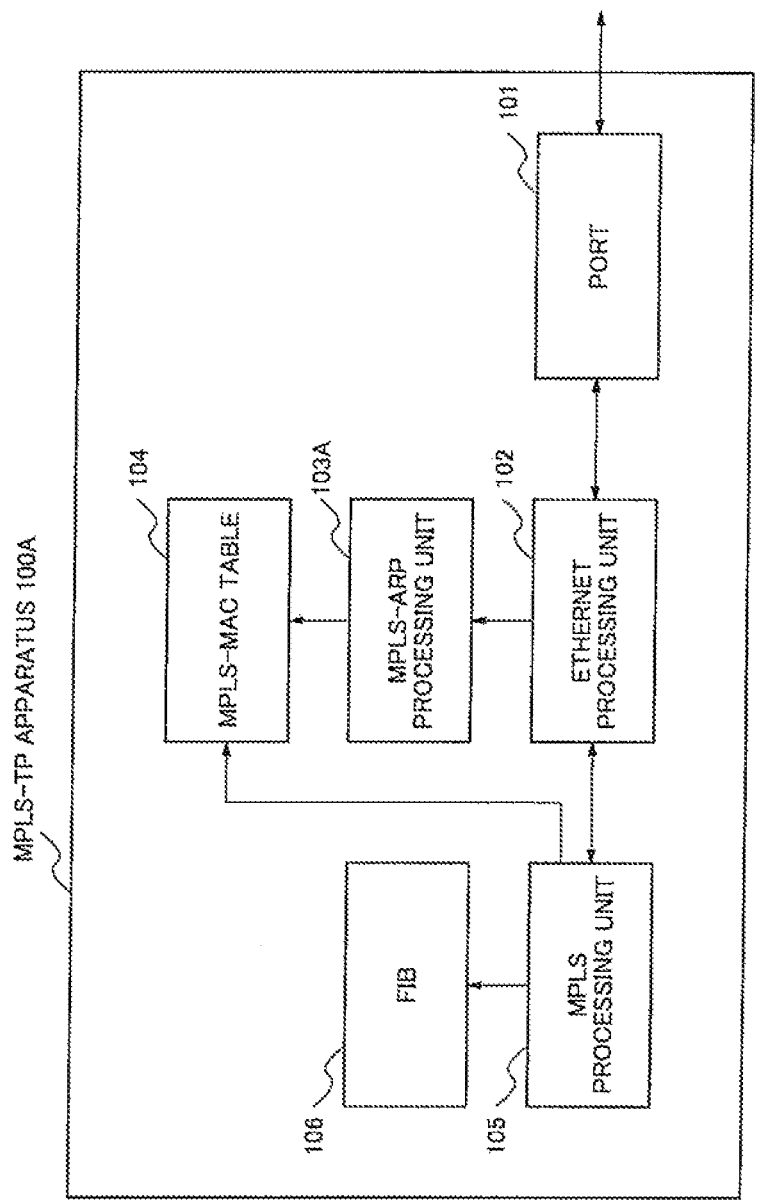
FIG. 7 is an explanatory drawing showing another example of an exemplary configuration of an MPLS-TP apparatus according to the present invention.

FIG. 7 is a figure showing an exemplary configuration of an MPLS-TP apparatus according to the embodiment 2.

Referring to FIG. 7, the embodiment 2 is different in a point that an MPLS-TP apparatus 100A includes an MPLS-ARP processing unit 103A instead of the MPLS-MAC learning unit 103 of the MPLS-TP apparatus 100 shown in FIG. 1.

The MPLS-ARP processing unit 103A generates an MPLS-ARP packet which searches for a MAC address for a specific MPLS label. The MPLS-ARP processing unit 103A sends and receives an MPLS-ARP packet U) between a neighboring MPLS-TP apparatus and registers a MAC search result in the MPLS-MAC table 104.

In the following, the MPLS-ARP packet will be described in detail with reference to FIG. 8.

Figure 8:
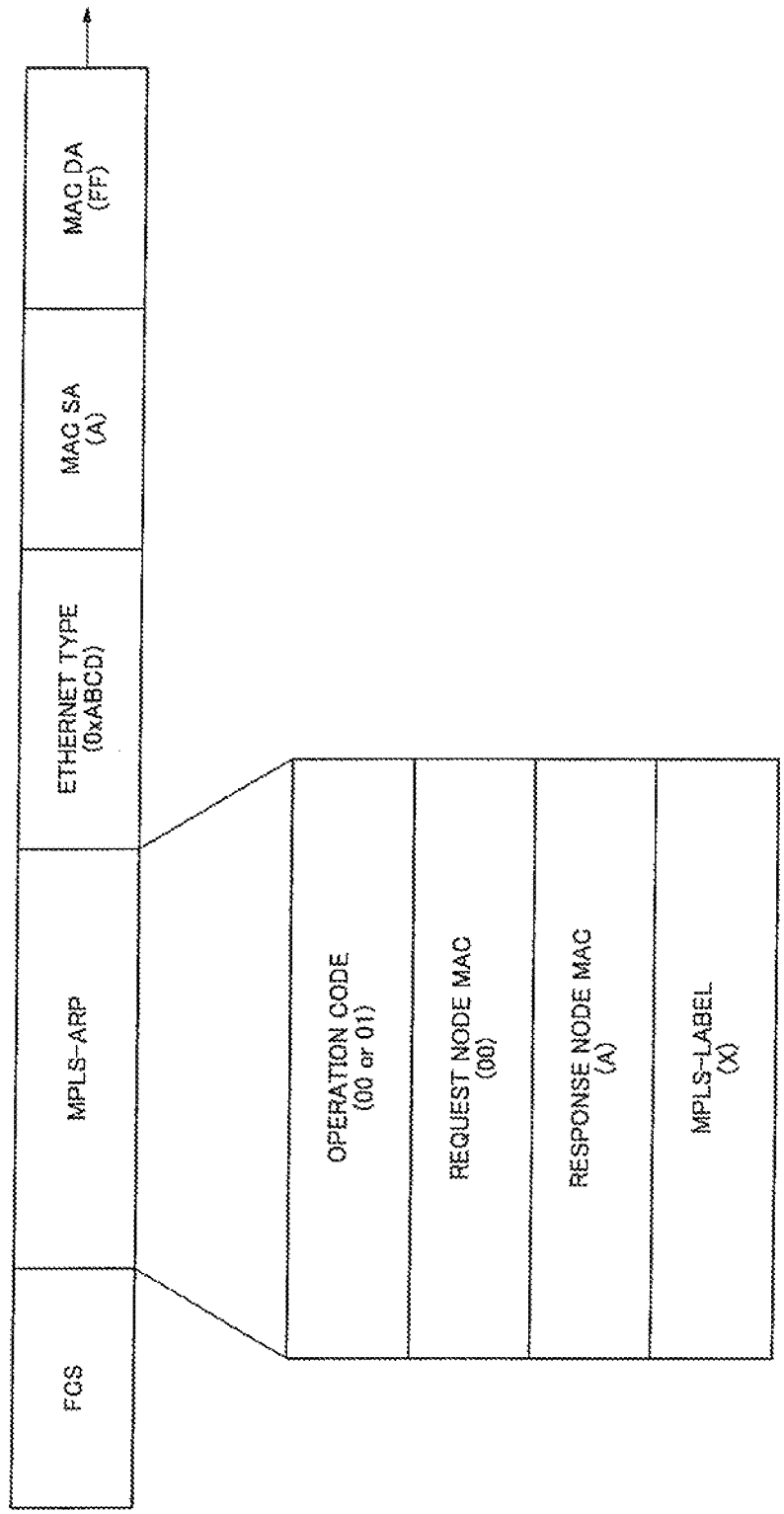
FIG. 8 is an example of an MPLS-ARP packet used for a MAC search system of an MPLS-TP apparatus according to the present invention.

FIG. 8 is an example of an MPLS-ARP packet used for a MAC search system of the MPLS-TP apparatus 101A according to the embodiment 2.

As shown in FIG. 8, the MPLS-ARP packet includes fields of MAC DA, MAC SA, Ethernet Type, MPLS-ARP payload and FCS.

In case an MPLS-ARP packet is a request message of MPLS-ARP, a broadcast address is made MAC DA. A multicast address may be used instead of the broadcast address. Also, in case an MPLS-ARP packet is a response message of MPLS-ARP, a source MAC address of a request message is made MAC DA.

MAC SA shows a MAC address of the node or interface.

Ethernet Type is a reserved value for indicating an MPLS-ARP packet. For example, a request message of MPLS-ARP may be made 0xABCD and a response message of MPLS-ARP may be made 0xABCE.

MPLS-ARP payload includes three fields of: Request Node MAC, Response Node MAC and MPLS-Label.

In case an MPLS-ARP packet is a request message of MPLS-ARP, a MAC address of the node is inserted in Request Node MAC, Response Node MAC is set to All 0, and MPLS-Label is made a label value of the target.

In case an MPLS-ARP packet is a response message of MPLS-ARP, Request Node MAC included in the request message of MPLS-ARP is applied to Request Node MAC as it is. Also, the node MAC address is inserted in Response Node MAC, and MPLS-Label is made a label value of the target.

FCS is a redundant bit of four octets for detecting an error of a frame.

[Description of Operation of the Embodiment 2]

Next, operation of the embodiment 2 will be described.

Figure 9:
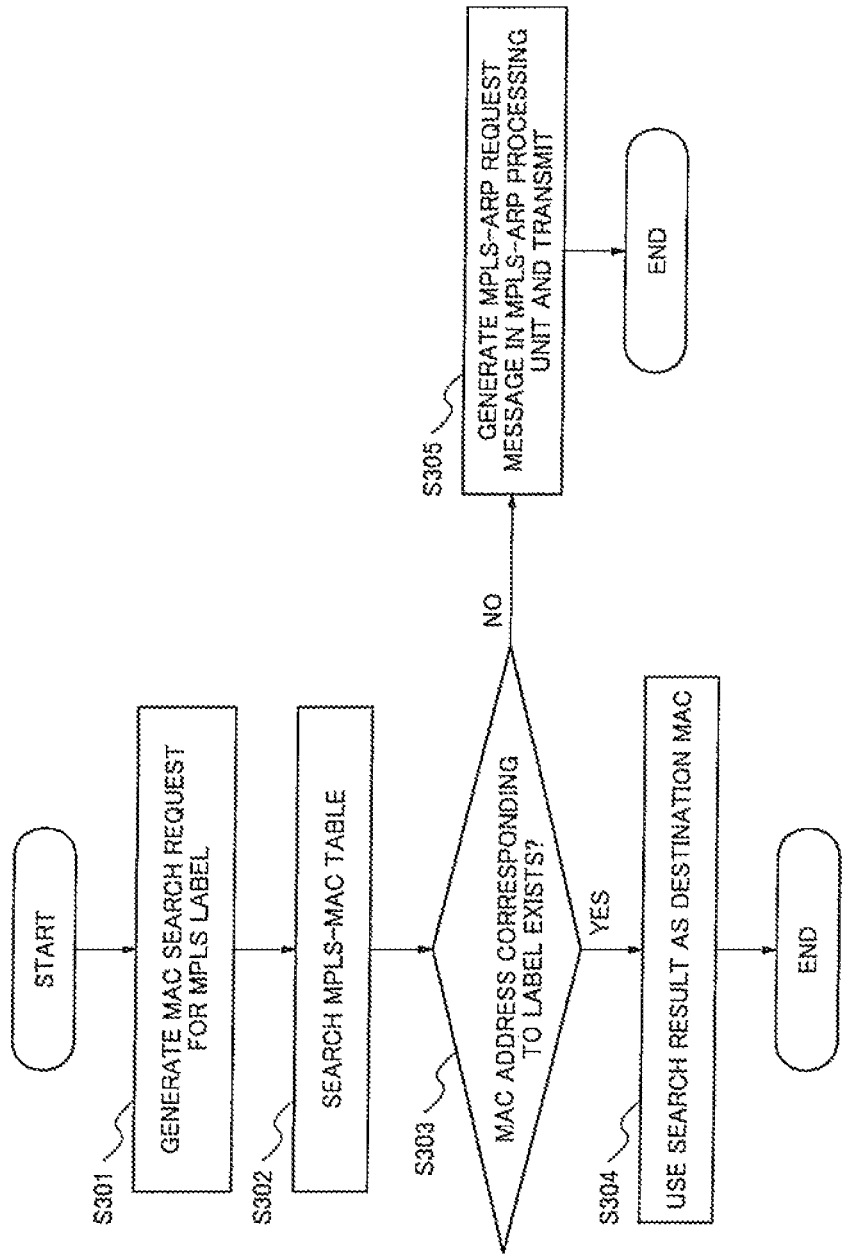
FIG. 9 is an example of a flow chart illustrating operation of processing until an MPLS-ARP packet is generated and transmitted.

First, referring to a flow chart of FIG. 9, operation of processing will be described in detail until MPLS-ARP packet is generated and transmitted.

In case a MAC search request occurs for a specific MPLS label and a port (S301), the MPLS-TP apparatus searches the MPLS-MAC table 104 (S302).

In case there exists a MAC address corresponding to the requested MPLS label (S303), the search result is used as a destination MAC address of the MPLS-TP packet (S304).

On the contrary, in case there exists no MAC address corresponding to the requested MPLS label in the MPLS-MAC table 104 (S303), an MPLS-ARP request message is generated in the MPLS-ARP processing unit 103A and broadcasted to the corresponding transmitting port (S305) A multicasting may be used instead of broadcasting in the step S305.

Figure 10:
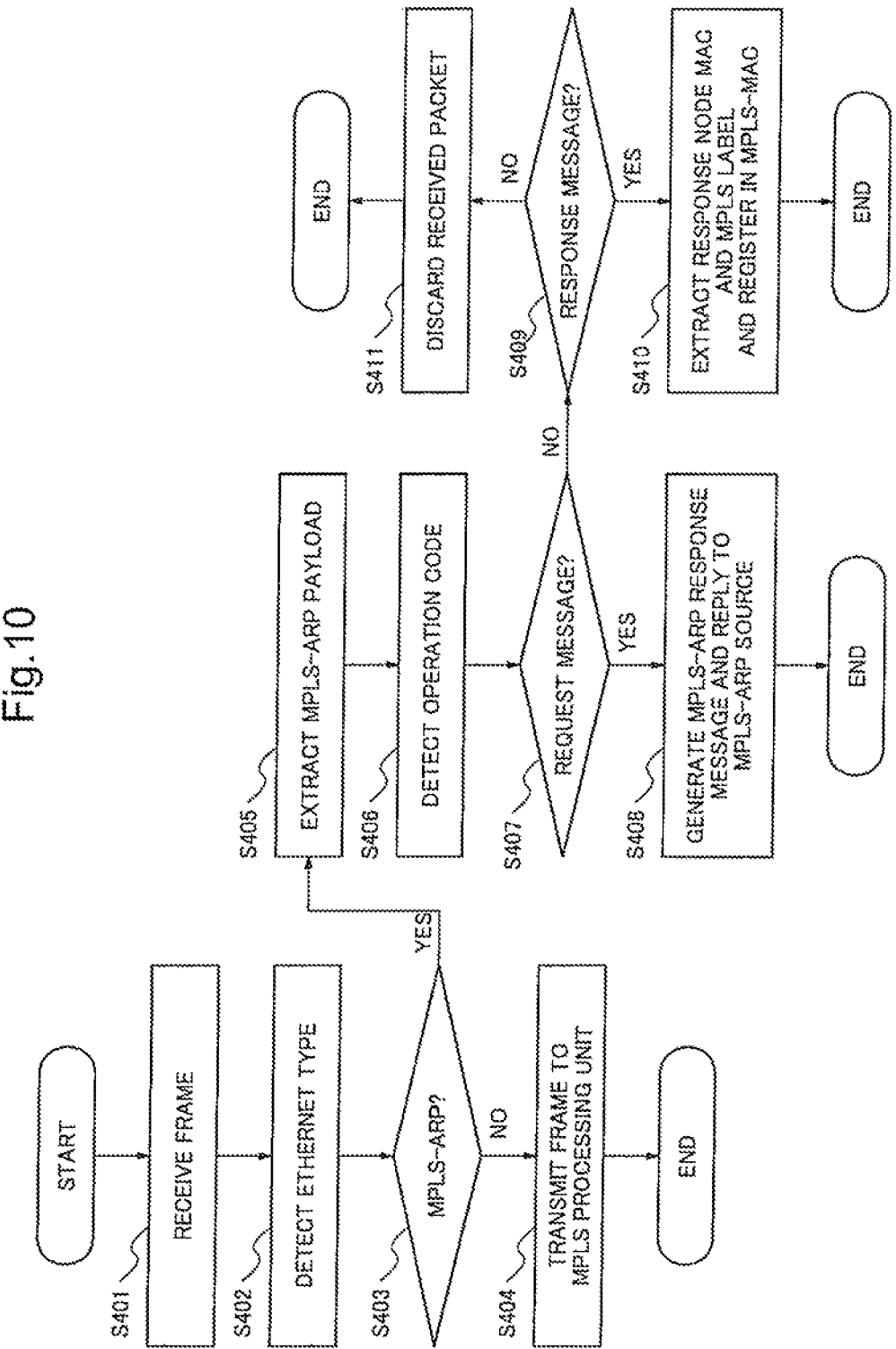
FIG. 10 is an example of a flow chart illustrating operation of MPLS-ARP receiving and replying processing.

Next, operation of MPLS-ARP receiving and replying processing will be described in detail with reference to a flow chart of FIG. 10.

When the MPLS-TP apparatus 101A receives an MPLS-TP packet from outside (Receive frame: S401), the Ethernet processing unit 102 detects Ethernet Type of the received packet (S402).

When the Ethernet Type of the received packet is not an MPLS-ARP packet (S403), the Ethernet processing unit 102 transmits the received packet to the MPLS processing unit 105 (S404).

On the contrary, when the Ethernet Type of the received packet is a value which indicates an MPLS-ARP packet (S403), MPLS-ARP payload is extracted (S405).

Operation Code as an operation code of the MPLS-ARP payload is detected (S406), and when it is a value which indicates a request message (S407), an MPLS-ARP response message is generated and replied to an MPLS-ARP source (S408).

Also, when Operation Code is a value which indicates a response message (S409), Response Node MAC and MPLS label of the MPLS-ARP payload are extracted and registered in the MPLS-MAC table 104 (S410). Moreover, in case Operation Code includes a value which is neither a response message nor a request message, corresponding packet is discarded and processing ends (S411).

[Advantageous Effect]

In the embodiment 2 according to the present invention, there is an effect indicated below.

According to the embodiment 2, in an MPLS-TP apparatus which does not include an IP layer and in case lower layer is an Ethernet, by including MPLS-ARP which searches for a MAC address beforehand from an MPLS label, cost increase and erroneous setting by manual setting can be avoided.

Further, while the invention has been particularly shown and described with reference to exemplary embodiments thereof, the invention is not limited to these embodiments. It will be understood by those of ordinary skill, in the art that various changes in form and details may be made therein without departing from the spirit and scope of the present invention as defined by the claims.

<The Embodiment 3>
[Structure]

Figure 13:
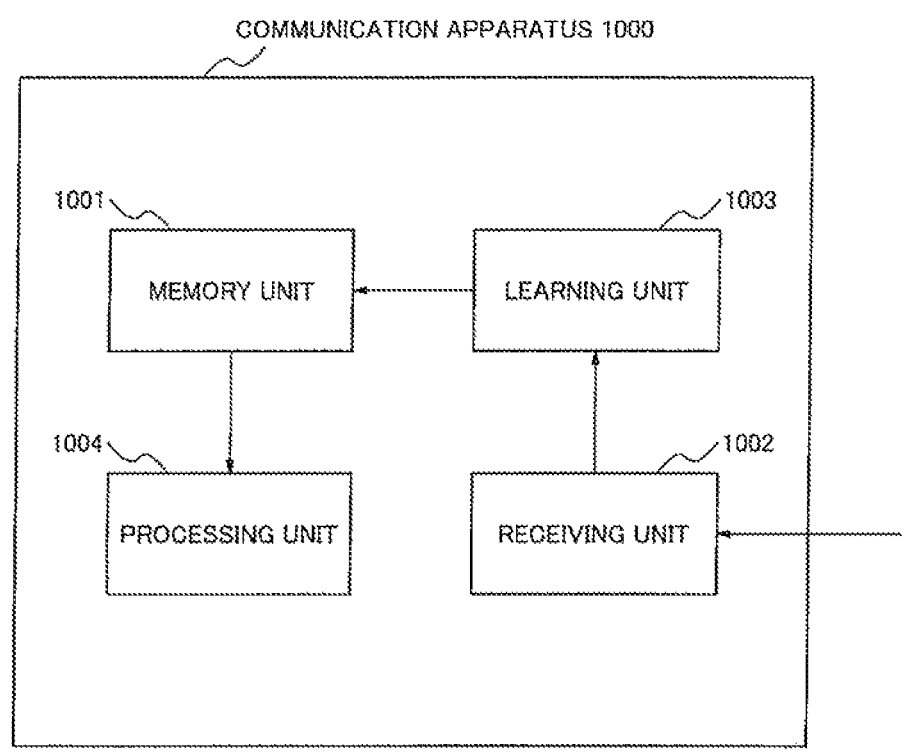
FIG. 13 is a figure showing an exemplary configuration of the embodiment 3 according to the present invention.

Next, the embodiment 3 of the present invention will be described. FIG. 13 indicates an exemplary configuration of a communication apparatus 1000 according to the embodiment 3.

According to FIG. 13, the communication apparatus 1000 includes a memory unit 1001, a receiving unit 1002, a learning unit 1003 and a processing unit 1004.

The memory unit 1001 correlates a label assigned to a packet and an address of a source of the packet, and stores it as an entry.

The receiving unit 1002 receives a packet from a network.

Further, operation of the learning unit 1003 and the processing unit 1004 will be described in detail below.

[Description of Operation]

Next, operation of the embodiment 3 will be described with reference to FIG. 14. FIG. 14 is a flow chart showing operation of the embodiment 3. In the following, the communication apparatus 1000 is described supposing it performs operation of FIG. 14.

First, the receiving unit 1002 receives a packet from a network (S1001).

Next, the learning unit 1003 first judges whether or not there exists an entry corresponding to the packet which the receiving unit 1002 received in the memory unit 1001 (S1002).

In case it is judged in S1002 that there exists no entry corresponding to the received packet in the memory unit 1001, S1003 is performed (S1002: No). In S1003, the learning unit 1003 stores a label assigned to the received packet and a source address of the received packet in the memory unit 1001 (S1003).

Also, in case it is judged in S1002 that there exists an entry corresponding to the received packet in the memory unit 1001, S1004 is performed (S1002: Yes). In S1004, the processing unit 1004 assigns an address corresponding to the received packet to the received packet (S1004).

[Advantageous Effect]

According to the embodiment 3, in case there exists an entry corresponding to the received packet in the memory unit 1001, the corresponding address is assigned to the received packet. Also, according to the embodiment 3, in case there exists no entry corresponding to the received packet, a label assigned to the received packet and a source address of the received packet are stored in the memory unit 1001.

By the operation mentioned above, according to the embodiment 3, an address which should be assigned to a packet can be solved without depending on a certain specific communication standard.

[Problems of Background Art]

By the way, in the inventions described in Patent documents 1 and 2 explained as a background art, an object is to specify an output port, and a MAC address which corresponds to an output label is not specified.

Also, invention described in Patent document 2 does not specify a MAC address which corresponds to an output label, even though it learns a MAC address corresponding to an IP address.

Figure 11:
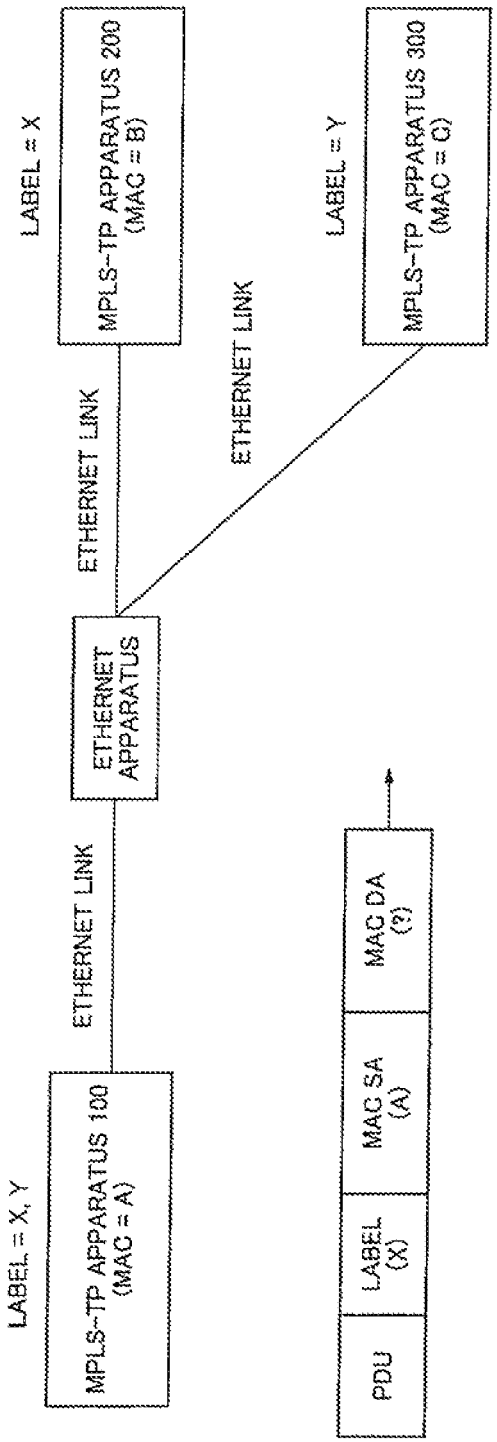
FIG. 11 is an example of an explanatory drawing in case an MPLS-TP apparatus transmits an MPLS-TP packet via an Ethernet (registered trademark) network.

Here, referring to FIG. 11, when an MPLS-TP apparatus transmits an MPLS-TP packet via an Ethernet network, a destination MAC address which should be assigned to the packet is unknown.

FIG. 11 is an example of an explanatory drawing in case an MPLS-TP apparatus transmits an MPLS-TP packet via an Ethernet network.

Also, as a protocol which solves MAC DA, although there exists ARP of an IP layer, because MPLS-TP needs to operate independent of the IP layer, ARP can not be used.

Figure 12:
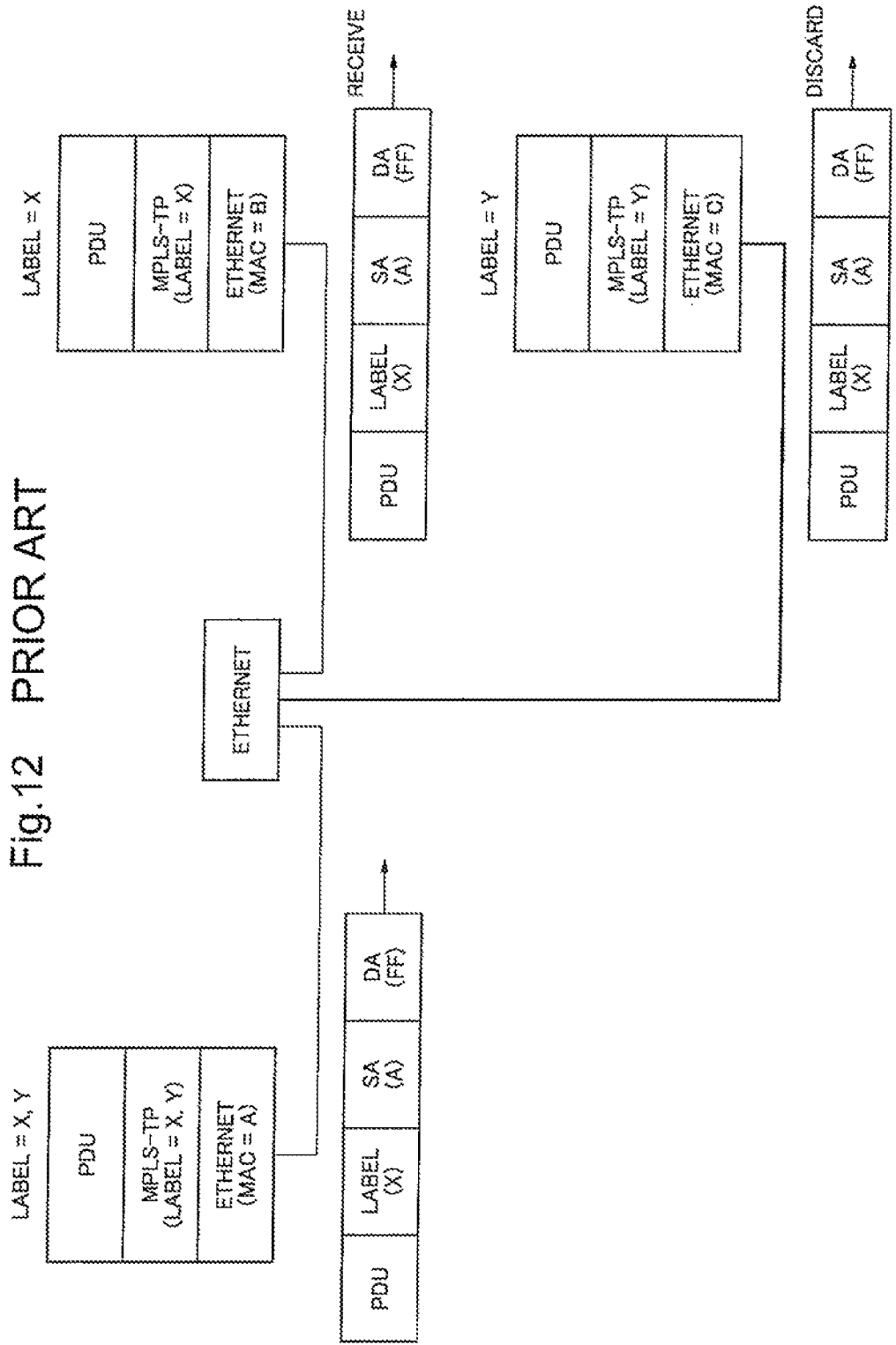
FIG. 12 is another example of an explanatory drawing in case an MPLS-TP apparatus transmits an MPLS-TP packet via an Ethernet (registered trademark) network.

Although it can also be considered to set broadcast MAC DA and transmit, there is a problem of poor band utilization efficiency and so on (refer to FIG. 12).

FIG. 12 is another example of an explanatory drawing in case an MPLS-TP apparatus transmits an MPLS-TP packet via an Ethernet network.

Further, a method to set MAC DA manually can also be considered, though, there is a problem that setting takes time and effort, or services (meaning a program which stays in a background and continues to operate in order to provide any functions immediately according to a request of a user or software in execution) may receive influences by a setting mistake.

[Other Embodiments]

As other embodiments, the following search systems and search methods can be exemplified.

A MAC search system of an MPLS-TP apparatus connected to a network using a predetermined network standard is characterized in that; a first MPLS-TP apparatus and a second MPLS-TP apparatus transmits an MPLS-TP packet which makes a broadcast MAC address as a destination MAC address; and a third MPLS-TP apparatus, by combining and learning an MPLS label of the MPLS-TP packet received, a receiving port and a source MAC address, assigns the MAC address to the MPLS-TP packet including the MPLS labels.

A MAC search system of an MPLS-TP apparatus connected to a network using a predetermined network standard is characterized in that; a first MPLS-TP apparatus includes an MPLS-ARP means to search for a MAC address for an MPLS label which connects with a second MPLS-TP apparatus; the first MPLS-TP apparatus transmits an MPLS-ARP request message to the MPLS label; the second MPLS-TP apparatus which receives the MPLS-ARP request message generates an MPLS-ARP response message including a MAC addresses of own apparatus and replies to the first MPLS-TP apparatus; and the first MPLS-TP apparatus assigns the MAC address to an MPLS-TP packet including the MPLS label by receiving the MPLS-ARP response message and by learning the MAC address.

A MAC search method of an MPLS-TP apparatus which does not include an IP layer assigns an appropriate destination MAC address automatically to an MPLS label in case lower layer is of a predetermined network standard.

The MAC search method may further include: detecting a type of a network standard when an MPLS-TP apparatus receives an MPLS-TP packet from outside; detecting an MPLS label and a receiving port and searching with the MPLS label and the receiving port as a search key when the type is an MPLS packet; when there exists no corresponding entry, adding an entry corresponding to the search key to an MPLS-MAC table; after registering a source MAC address of the MPLS-TP packet in the entry corresponding to the search key, transferring the MPLS-TP packet to an MPLS processing unit; when there exists a corresponding entry, after overwriting and registering a source MAC address of the MPLS-TP packet in the entry corresponding to the search key, transferring the MPLS-TP packet to an MPLS processing unit; based on the label of the MPLS-TP packet and the receiving port, searching an FIB 106 and acquiring an MPLS-TP label and a transmitting port of a next hop; based on the MPLS-TP label and the transmitting port of the next hop, searching an MPLS-MAC table; in case a corresponding entry is registered, assigning the search result as a destination address of the MPLS-TP packet and transmitting it to a processing unit; and in case a corresponding label is not registered, assigning a broadcast address to a destination address of the MPLS-TP packet and transmitting it to a processing unit.

Another MAC search method may further include: in case a MAC search request is generated for specific "MPLS label and port", an MPLS-TP apparatus searching a MPLS-MAC table; in case there exists a MAC address for the corresponding label, using the search result as a destination MAC address of an MPLS-TP packet; in case there exists no MAC address for the corresponding label in the MPLS-MAC table, generating an MPLS-ARP request message and broadcasting it to the corresponding transmitting port; when the MPLS-TP packet is received, detecting a type of a network standard; in case the type is not an MPLS-ARP packet, transmitting it to an MPLS processing unit; when the type is an MPLS-ARP packet, extracting an MPLS-ARP payload and detecting an operation code of the MPLS-ARP payload; when it is a value indicating a request message, generating an MPLS-ARP response message and replying to an MPLS-ARP source; when the operation code is a value indicating a response message, extracting Response Node MAC and MPLS label of the MPLS-ARP payload and registering them in the MPLS-MAC table; and in case the operation code includes a value which is neither a response message nor a request message, discarding the corresponding packet and ending processing.

[Effect of the Invention]

According to the present invention, provision of a MAC search system and a MAC search method of an MPLS-TP apparatus which, when an MPLS-TP apparatus transmits an MPLS-TP packet via a predetermined network, does not depend on an IP layer and solves a destination MAC address which should be assigned to the packet can be realized.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary note 1) A MAC search system for MPLS-TP apparatuses connected to a network using a predetermined network standard, wherein a first MPLS-TP apparatus and a second MPLS-TP apparatus transmit an MPLS-TP packet with a broadcast MAC address as a destination MAC address, and a, third MPLS-TP apparatus, by learning an MPLS label of the received MPLS-TP packet, a receiving port and a source MAC address in combination, assigns the MAC address to the MPLS-TP packet including the MPLS labels.

(Supplementary note 2) A MAC search system for MPLS-TP apparatuses connected to a network using a predetermined network standard, wherein a first MPLS-TP apparatus comprises an MPLS-ARP means to search for a MAC address for an MPLS label which connects with a second MPLS-TP apparatus, the first MPLS-TP apparatus transmits an MPLS-ARP request message to the MPLS label, the second MPLS-TP apparatus which receives the MPLS-ARP request message generates an MPLS-ARP response message including a MAC addresses of the second MPLS-TP apparatus and replies to the first MPLS-TP apparatus, and the first MPLS-TP apparatus assigns the MAC address to an MPLS-TP packet including the MPLS labels by receiving the MPLS-ARP response message and by learning the MAC address.

(Supplementary note 3) A MAC search system for MPLS-TP apparatuses which do not include an IP layer, wherein in case lower layer is of a predetermined network standard, the system assigns an appropriate destination MAC address automatically to an MPLS label.

(Supplementary note 4) A MAC search method for an MPLS-TP apparatus comprising: when an MPLS-TP apparatus receives an MPLS-TP packet from outside, detecting a type of a network standard; when the type is an MPLS, packet, detecting an MPLS label and a receiving port and searching with the MPLS label and the receiving port as a search key; when there exists no corresponding entry, adding an entry corresponding to the search key to an MPLS-MAC table; after registering a source MAC address of the MPLS-TP packet in the entry corresponding to the search key, transferring the MPLS-TP packet to an MPLS processing unit; when there exists a corresponding entry, after overwriting and registering a source MAC address of the MPLS-TP packet in the entry corresponding to the search key, transferring the MPLS-TP packet to an MPLS processing unit; based on the label of the MPLS-TP packet and the receiving port, searching an FIB 106 and acquiring an MPLS-TP label and a transmitting port of a next hop; based on the MPLS-TP label and the transmitting port of the next hop, searching an MPLS-MAC table; in case a corresponding entry is registered, assigning the search result as a destination address of the MPLS-TP packet and transmitting it to a processing unit; and in case a corresponding label is not registered, assigning a broadcast address to a destination address of the MPLS-TP packet and transmitting it to a processing unit.

(Supplementary note 5) A MAC search method for an MPLS-TP apparatus comprising: in case a MAC search request is generated for specific "MPLS label and port", an MPLS-TP apparatus searching an MPLS-MAC table; in case there exists a MAC address for the corresponding label, using the search result as a destination MAC address of an MPLS-TP packet; in case there exists no MAC addresses for the corresponding label in the MPLS-MAC table, generating an MPLS-ARP request message and broadcasting it to the corresponding transmitting port; when the MPLS-TP packet is received, detecting a type of a network standard; in case the type is not an MPLS-ARP packet, transmitting it to a MPLS processing unit; when the type is an MPLS-ARP packet, extracting an MPLS-ARP payload and detecting an operation code of the MPLS-ARP payload; when it is a value indicating a request message, generating an MPLS-ARP response message and replying to an MPLS-ARP source; when the operation code is a value indicating a response message, extracting Response Node MAC and MPLS label of the MPLS-ARP payload and registering them in the MPLS-MAC table; and in case the operation code includes a value which is neither a response message nor a request message, discarding the corresponding packet and ending processing.

(Supplementary note 6) A communication apparatus comprising: a memory unit which correlates a label assigned to a packet and an address of a source of the packet, and memorizes them as an entry;

a receiving unit which receives a packet from a network;

a learning unit which judges whether or not there exists an entry corresponding to said received packet in said memory unit, and in case there exists no entry corresponding to said received packet in said memory unit, stores a label assigned to said received packet and an address of a source of said received packet in the memory unit; and a processing unit which, in case there exists an entry corresponding to said received packet in said memory unit, assigns an address corresponding to said received packet to said received packet.

(Supplementary note 7) The communication apparatus according to Supplementary note 6, wherein:

in case there exists an entry corresponding to said received packet in said memory unit, said processing unit assigns an address corresponding to said received packet as a destination MAC address of said received packet; and in case there exists no entry corresponding to said received packet in said memory unit, said processing unit assigns an address which is to send a plurality of destinations, as a destination MAC address of said received packet.

(Supplementary note 8) The communication apparatus according to Supplementary note 6, wherein:

in case there exists an entry corresponding to said received packet in said memory unit, said processing unit assigns an address corresponding to said received packet as a destination MAC address of said received packet; and in case there exists no entry corresponding to said received packet in said memory unit, said processing unit generates an MPLS-ARP request message and transmits it.

(Supplementary note 9) The communication apparatus according to Supplementary note 6, wherein in case said received packet is an MPLS packet and it is judged that there exists no entry corresponding to said received packet in said memory unit, said learning unit stores an entry comprising an MPLS label and a receiving port of said received packet in said memory unit.

(Supplementary note 10) The communication apparatus according to Supplementary note 6, wherein in case said received packet is an MPLS-ARP packet response message, said learning unit extracts a MAC address of a request side of said received packet and an MPLS label, and stores them in said memory to unit.

(Supplementary note 11) A communication system comprising a plurality of communication apparatuses connected each other, wherein at least one among said plurality of communication apparatuses comprises:

a memory unit which correlates a label assigned to a packet and an address of a source of the packet, and memorizes them as an entry;

a receiving unit which receives a packet from a network;

a learning unit which judges whether or not there exists an entry corresponding to said received packet in said memory unit, and in case there exists no entry corresponding to said received packet in said memory unit, stores a label assigned to said received packet and an address of a source of said received packet in the memory unit; and a processing unit which, in case there exists an entry corresponding to said received packet in said memory unit, assigns an address corresponding to said received packet to said received packet.

(Supplementary note 12) The communication system according to Supplementary note 11, wherein:

in case there exists an entry corresponding to said received packet in said memory unit, said processing unit assigns an address corresponding to said received packet as a destination MAC address of said received packet; and in case there exists no entry corresponding to said received packet in said memory unit, said processing unit assigns an address which is to send a plurality of destinations, as a destination MAC address of said received packet.

(Supplementary note 13) The communication system according to Supplementary note 11, wherein:

in case there exists an entry corresponding to said received packet in said memory unit, said processing unit assigns an address corresponding to said received packet as a destination MAC address of said received packet; and in case there exists no entry corresponding to said received packet in said memory unit, said processing unit generates an MPLS-ARP request message and transmits it.

(Supplementary note 14) The communication system according to Supplementary note 11, wherein:

in case said received packet is an MPLS packet and it is judged that there exists no entry corresponding to said received packet in said memory unit, said learning unit stores an entry comprising an MPLS label and a receiving port of said received packet in said memory unit.

(Supplementary note 15) The communication system according to Supplementary note 11, wherein:

in case said received packet is an MPLS-ARP packet response message, said learning unit extracts a MAC address of a request side of said received packet and an MPLS label, and stores them in said memory unit.

(Supplementary note 16) A communication method comprising:

receiving a packet from a network;

judging whether or not there exists an entry corresponding to said received packet in a memory unit which correlates a label assigned to a packet and an address of a source of the packet, and memorizes them as an entry;

in case there exists no entry corresponding to said received packet in said memory unit, storing a label assigned to said received packet and an address of a source of said received packet in the memory unit; and in case there exists an entry corresponding to said received packet in said memory unit, assigning an address corresponding to said received packet to said received packet.

(Supplementary note 17) The communication method according to Supplementary note 16, further comprising:

in case there exists an entry corresponding to said received packet in said memory unit, assigning an address corresponding to said received packet as a destination MAC address of said received packet; and in case there exists no entry corresponding to said received packet in said memory unit, assigning an address which is to send a plurality of destinations, as a destination MAC address of said received packet.

(Supplementary note 18) The communication method according to Supplementary note 16, further comprising:

in case there exists an entry corresponding to said received packet in said memory unit, assigning an address corresponding to said received packet as a destination MAC address of said received packet; and in case there exists no entry corresponding to said received packet in said memory unit, generating an MPLS-ARP request message and transmitting it.

(Supplementary note 19) The communication method according to Supplementary note 16, further comprising:

in case said received packet is an MPLS packet and it is judged that there exists no entry corresponding to said received packet in said memory unit, storing an entry comprising an MPLS label and a receiving port of said received packet in said memory unit.

(Supplementary note 20) The communication method according to Supplementary note 16, further comprising:

in case said received packet is an MPLS-ARP packet response message, extracting a MAC address of a request side of said received packet and an MPLS label, and storing them in said memory unit.

The invention claimed is:

1. A communication apparatus comprising:
a memory unit which correlates an MPLS (multi-protocol label switching) label assigned to an MPLS packet and an address of a source of the packet, and memorizes said MPLS label and said address as an entry;
a receiving unit which receives said MPLS packet from a network;
a learning unit which stores said MPLS label assigned to said received packet and an address of a source of said received packet in the memory unit upon existing no entry corresponding to said received MPLS packet in said memory unit; and
a processing unit which assigns an address corresponding to said received MPLS packet to said received MPLS packet upon existing an entry corresponding to said received MPLS packet in said memory unit,
wherein:
upon there existing an entry corresponding to said received packet in said memory unit, said processing unit assigns an address corresponding to said received MPLS packet as a destination MAC (media access control) address of said MPLS received packet; and
upon there not existing any entry corresponding to said received MPLS packet in said memory unit, said processing unit generates an MPLS-ARP (MPLS-address resolution protocol) request message which includes an MPLS label of said received MPLS packet and transmits said MPLS-ARP request, wherein said MPLS-ARP request message is used in searching for a MAC address of said MPLS label.

2. A communication apparatus comprising:
a memory unit which correlates an MPLS (multi-protocol label switching) label assigned to an MPLS packet and an address of a source of the packet, and memorizes said MPLS label and said address as an entry;
a receiving unit which receives said MPLS packet from a network;
a learning unit which stores said MPLS label assigned to said received packet and an address of a source of said received packet in the memory unit upon existing no entry corresponding to said received MPLS packet in said memory unit; and
a processing unit which assigns an address corresponding to said received MPLS packet to said received MPLS packet upon existing an entry corresponding to said received MPLS packet in said memory unit,
wherein:
said learning unit extracts a MAC address of a response side of said received packet and an MPLS label and stores said extracted MAC address and said MPLS label in said memory unit upon receiving an MPLS-ARP (MPLS-address resolution protocol) packet response message which includes said MPLS label of said received MPLS packet, wherein said MPLS-ARP packet response message is used in response to an MPLS-ARP request message used in searching for a MAC address of an MPLS label.

3. A communication system comprising a plurality of communication apparatuses connected to each other, wherein at least one among said plurality of communication apparatuses comprises:
a memory unit which correlates an MPLS (multi-protocol label switching) label assigned to an MPLS packet and an address of a source of the packet, and memorizes said MPLS label and said address as an entry;
a receiving unit which receives said MPLS packet from a network;
a learning unit which stores said MPLS label assigned to said received packet and an address of a source of said received packet in the memory unit upon existing no entry corresponding to said received MPLS packet in said memory unit; and
a processing unit which assigns an address corresponding to said received MPLS packet to said MPLS received packet upon existing an entry corresponding to said received MPLS packet in said memory unit, wherein:
upon there existing an entry corresponding to said received MPLS packet in said memory unit, said processing unit assigns an address corresponding to said received MPLS packet as a destination MAC (media access control) address of said received MPLS packet; and
upon there not existing an entry corresponding to said received MPLS packet in said memory unit, said processing unit generates an MPLS-ARP (MPLS-address resolution protocol) request message which includes an MPLS label of said received MPLS packet and transmits said MPLS-ARP request, wherein said MPLS-ARP request message is used in searching for a MAC address of said MPLS label.

4. A communication system comprising a plurality of communication apparatuses connected to each other, wherein at least one among said plurality of communication apparatuses comprises:
a memory unit which correlates an MPLS (multi-protocol label switching) label assigned to an MPLS packet and an address of a source of the packet, and memorizes said MPLS label and said address as an entry;
a receiving unit which receives said MPLS packet from a network;
a learning unit which stores said MPLS label assigned to said received packet and an address of a source of said received packet in the memory unit upon existing no entry corresponding to said received MPLS packet in said memory unit; and
a processing unit which assigns an address corresponding to said received MPLS packet to said MPLS received packet upon existing an entry corresponding to said received MPLS packet in said memory unit,
wherein:
said learning unit extracts a MAC address of a response side of said received packet and an MPLS label and stores said extracted MAC address and said MPLS label in said memory unit upon receiving an MPLS-ARP (MPLS-address resolution protocol) packet response message which includes said MPLS label of said received MPLS packet, wherein said MPLS-ARP packet response message is used in response to an MPLS-ARP request message used in searching for a MAC address of an MPLS label.

5. A communication method comprising:
correlating, by a memory unit, an MPLS (multi-protocol label switching) label assigned to an MPLS packet and an address of a source of the packet and memorizing said MPLS label and said address as an entry;
receiving said MPLS packet from a network;
storing said MPLS label assigned to said received packet and an address of a source of said received packet in the memory unit upon existing no entry corresponding to said received MPLS packet in said memory unit; and assigning an address corresponding to said received MPLS packet to said received MPLS packet upon existing an entry corresponding to said received MPLS packet in said memory unit, wherein:

upon there existing an entry corresponding to said received MPLS packet in said memory unit, assigning an address corresponding to said received MPLS packet as a destination MAC (media access control) address of said received MPLS packet; and upon there not existing an entry corresponding to said MPLS received packet in said memory unit, generating an MPLS-ARP (MPLS-address resolution protocol) request message and transmitting said MPLS-ARP request, wherein said MPLS-ARP request message is used in searching for a MAC address of said MPLS label.

6. A communication method comprising:

correlating, by a memory unit, an MPLS (multi-protocol label switching) label assigned to an MPLS packet and an address of a source of the packet and memorizing said MPLS label and said address as an entry;

receiving said MPLS packet from a network;

storing said MPLS label assigned to said received packet and an address of a source of said received packet in the memory unit upon existing no entry corresponding to said received MPLS packet in said memory unit;

assigning an address corresponding to said received MPLS packet to said received MPLS packet upon existing an entry corresponding to said received MPLS packet in said memory unit, and extracting a MAC address of a response side of said received packet and an MPLS label and storing said extracted MAC address and said MPLS label in said memory unit upon receiving an MPLS-ARP (MPLS-address resolution protocol) racket response messaage which includes said MPLS label of said received MPLS packet, wherein said MPLS-ARP packet response message is used in response to an MPLS-ARP request message used in searching for a MAC address of an MPLS label.

* * * * *